(12) United States Patent
Erno et al.

(10) Patent No.: US 8,777,802 B2
(45) Date of Patent: Jul. 15, 2014

(54) GEAR SYSTEM AND METHOD FOR USING SAME

(75) Inventors: Daniel Jason Erno, Clifton Park, NY (US); Fulton Jose Lopez, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 591 days.

(21) Appl. No.: 13/097,900

(22) Filed: Apr. 29, 2011

(65) Prior Publication Data

US 2012/0277056 A1    Nov. 1, 2012

(51) Int. Cl.
*F16H 57/08*    (2006.01)

(52) U.S. Cl.
USPC ........................................................ 475/346

(58) Field of Classification Search
CPC ........................................................ F16H 57/08
USPC ................................................ 475/346, 347
See application file for complete search history.

(56) References Cited

U.S. PATENT DOCUMENTS

| | | |
|---|---|---|
| 2,749,778 A | 6/1956 | Kuhn |
| 5,098,359 A | 3/1992 | Chales |
| 5,558,593 A | 9/1996 | Roder |
| 5,679,089 A | 10/1997 | Levedahl |
| 6,964,155 B2 | 11/2005 | McCune et al. |
| 6,994,651 B2 | 2/2006 | Fox |
| 7,056,259 B2 | 6/2006 | Fox |
| 7,297,086 B2 * | 11/2007 | Fox ............................ 475/331 |
| 7,591,754 B2 * | 9/2009 | Duong et al. .................. 475/347 |
| 2003/0073537 A1 | 4/2003 | Lloyd |
| 2008/0194378 A1 | 8/2008 | Fox |
| 2008/0274849 A1 | 11/2008 | Smook et al. |
| 2010/0197445 A1 * | 8/2010 | Montestruc ................ 475/346 |
| 2010/0317478 A1 | 12/2010 | McCune et al. |
| 2011/0039654 A1 | 2/2011 | Fox |
| 2011/0053730 A1 | 3/2011 | Fox |

FOREIGN PATENT DOCUMENTS

| | | |
|---|---|---|
| DE | 2339882 A1 | 2/1975 |
| RU | 2217634 C1 | 11/2003 |

OTHER PUBLICATIONS

Search Report and Written Opinion from corresponding EP Application No. 12164657.4-2421 dated Aug. 6, 2012.

* cited by examiner

*Primary Examiner* — Edwin A Young
(74) *Attorney, Agent, or Firm* — Ann M. Agosti

(57) ABSTRACT

A planet pin, a planetary gear system, and a method for balancing a load on a planetary gear system between respective planet gears. The planet pin includes a planet pin body having a flexure portion between a pair of ends. The flexure portion may be a planet pin body having grooves on opposing sides. The flexure portion may be a pair of pin bodies interference fit into annuluses of a centrally located barrel. The flexure portion may be a pair of pin arms extending from a centrally located ball joint.

7 Claims, 13 Drawing Sheets

GEAR SYSTEM AND METHOD FOR USING SAME

FIELD

The invention relates to a gear system, and more particularly, to a gear system with planet pins, for anchoring planet gears, which centralize the load on each of the planet gears and balance the load between the planet gears.

BACKGROUND

Planetary gear systems are known. Examples of planetary gear systems may be found in U.S. Pat. Nos. 6,994,651 and 7,297,086 and U.S. Patents Pubs. 2011/0039654 and 2011/0053730.

One such system, an epicyclic gear system 10, is shown in cross-section in FIG. 1 to include a planet pin 12 about which a sleeve 22 is disposed. A planet gear 26 encompasses the sleeve 22 and is connected thereto through a rib ring 30. The base 12 includes a groove 14 at a central location thereof. The sleeve 22 includes a tapered landing 24. The planet gear 26 has an indent 28. Rollers 32 are positioned between races found on an inner surface of the planet gear 26 and races found on an outer surface of the sleeve 22.

The planet pin 12 is press fit to an upwind carrier plate (not shown). The gear system 10 acts as a double joint system that allows the planet gear 26 to align to a ring gear and a sun gear (not shown) despite planet pin's 12 tangential location and misalignment. There is a gap 24 between sleeve 22 and planet pin 12 to allow relative motion and adjustment of the planet pin 12 for rotational and tangential dislocation due to forces being exerted on the planet gear 26.

Planetary gear systems, such as system 10, find use in applications such as wind turbines. Other potential applications can be found in mill operations, the oil and gas industry, and the aviation industry.

For known planetary gear systems utilizing multiple planet gears, a problem that has developed is the creation of an unbalanced load between the planet gears. As a rotating member—depending upon the gear system, the ring gear, the carrier, or the sun gear may supply an input to the gearbox—rotates, it places a force, or a load, on the planet gears. The load factor $K_\gamma$ of a planetary gear system may be defined as:

$$K_\gamma = T_{Branch} N_{CP} / T_{Nom}$$

Where $T_{Branch}$ is the torque for the gear with the heaviest load, $N_{CP}$ is the number of planets, and $T_{Nom}$ is the total nominal torque for the system. Ideally, the force should be the same on each planet gear, i.e., $K_\gamma = 1.0$, thereby creating a balanced load. However, for a variety of reasons planetary gear systems often suffer from unbalanced loads.

One reason is that the gear teeth of the planetary gears are manufactured with a normal variance for such teeth. For example, the thickness of the gear teeth may vary to an extent expected of tolerances for gear teeth. Additionally, the pitch—the distance between adjacent gear teeth—also may vary.

Under normal manufacturing practices, the planet pin holes in the carrier will be drilled away from their centric true positions. This is due to manufacturing tolerance limitations, complexity of the machined part, measuring capability, and human error. This scenario causes each planet gear to carry a load different from what they are designed for. Also, under normal loading conditions, the carrier may twist slightly. This twist may contribute to the misalignment between the planet gears and the ring gear/sun gear assembly. Depending on the number of planets and their respective tolerances, loads experienced by any single planet can increase dramatically, as much as 2× or more.

Reducing the load factor $K_\gamma$ on a gear system will allow smaller system components to be utilized or allow greater loads on system components than are currently placed. A more evenly distributed shared load may allow for an increase in the gearbox torque density.

With some of these concerns in mind, a planetary gear system that includes planetary gears that self-align as they mesh with a ring and a centralized, or sun, gear would be welcome in the art.

SUMMARY

An embodiment of the invention includes a planet pin configured to serve as an anchoring point for a planet gear within a carrier. The planet pin includes a planet pin body having a flexure portion between a pair of ends.

In one aspect, the flexure portion includes first and second pairs of grooves allowing flexure of the planet pin body in a first direction, the first pair of grooves being located on an opposing side of the planet pin body from the second pair of grooves.

In another aspect, the planet pin body includes first and second planet pin bodies and a centrally located barrel, wherein each of the first and second planet pin bodies are positioned within the centrally located barrel.

In another aspect, the planet pin body includes a ball joint and a pair of pin arms, the pin arms extending in opposite directions from the ball joint.

An embodiment of the invention includes a planetary gear system. The system includes a carrier having a central opening, a plurality of peripherally located openings and a plurality of planet pin openings; a rotatable central gear located within the central opening; and, a plurality of peripheral planet gears in meshed relationships with the rotatable central gear and anchored within respective ones of the planet pin openings with a planet pin. Each of the planet pins has a planet pin body that includes a flexure portion having first and second pairs of grooves allowing flexure of the planet pin body in a first direction, the first pair of grooves being located on an opposing side of the planet pin body from the second pair of grooves; a rib separating the grooves of each of the pairs of grooves; and, a pair of plates positioned on opposing surfaces of the planet pin body inhibiting flexure of the planet pin body in a second direction orthogonal to the first direction.

An embodiment of the invention includes a planetary gear system. The system includes a carrier having a central opening, a plurality of peripherally located openings and a plurality of planet pin openings; a rotatable central gear located within the central opening; and, a plurality of peripheral planet gears, each having a tapered opening and each being in meshed relationships with the rotatable central gear and anchored within respective ones of the planet pin openings with a planet pin. Each of the planet pins has a planet pin body that includes first and second planet pin bodies; and, a centrally located barrel with a core and a pair of flanges, each of the flanges surrounding an annulus and extending from the core; wherein each of the first and second planet pin bodies are interference fit within a respective one of the annuluses.

An embodiment of the invention includes a planetary gear system. The system includes a carrier having a central opening, a plurality of peripherally located openings and a plurality of planet pin openings; a rotatable central gear located within the central opening; and, a plurality of peripheral planet gears in meshed relationships with the rotatable central gear and anchored within respective ones of the planet pin openings with a planet pin, each said planet pin has a planet pin body comprising a ball joint and a pair of pin arms, the pin arms extending in opposite directions from the ball joint.

An embodiment of the invention includes a method for balancing a load on a planetary gear system between the planet gears. The method includes preparing a plurality of planet pins, each of the planet pins including a flexure portion; assembling the planet pins in a respective one of the planet gears; positioning the planet gears within a carrier; and intermeshing the planet gears with a central gear and a ring gear.

These and other features, aspects and advantages of the present invention may be further understood and/or illustrated when the following detailed description is considered along with the attached drawings.

DETAILED DESCRIPTION

Figure 1:
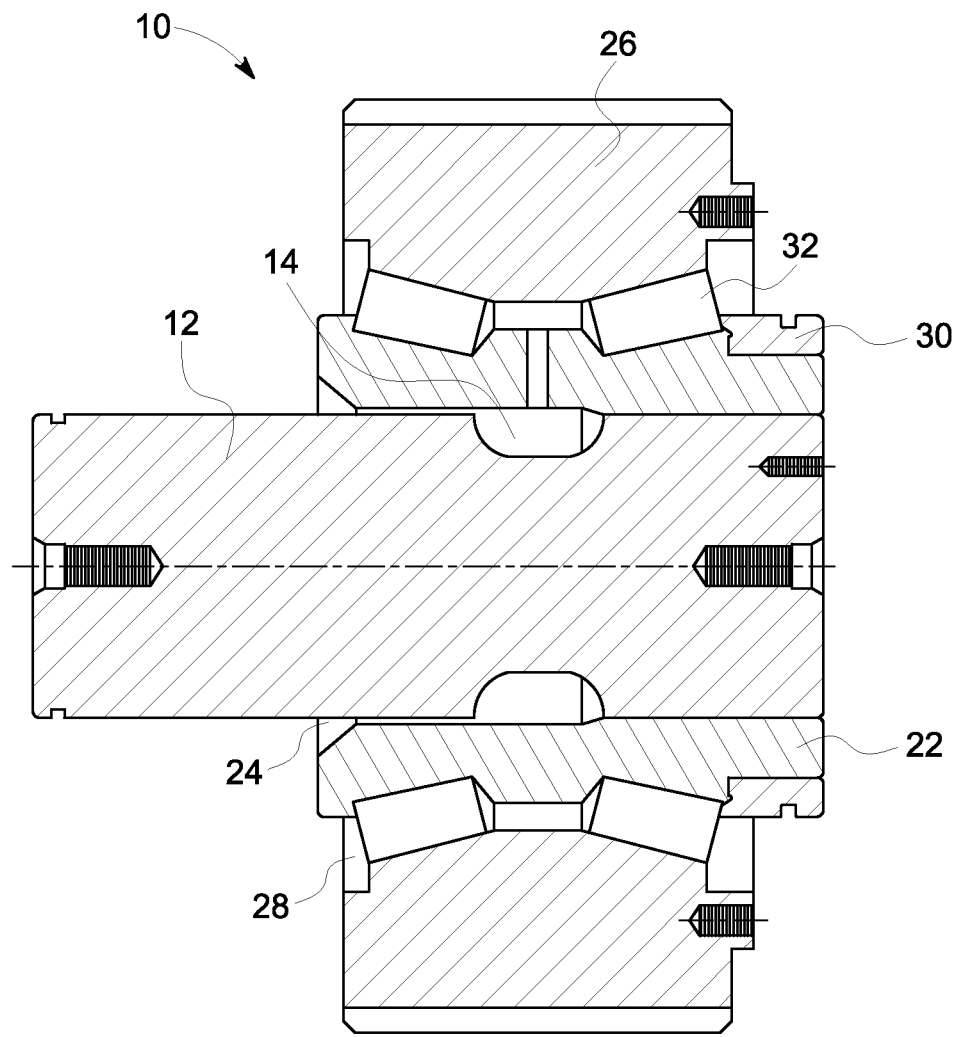
FIG. 1 is a cross-sectional view of a conventional planet gear system.

The present specification provides certain definitions and methods to better define the embodiments and aspects of the invention and to guide those of ordinary skill in the art in the practice of its fabrication. Provision, or lack of the provision, of a definition for a particular term or phrase is not meant to imply any particular importance, or lack thereof; rather, and unless otherwise noted, terms are to be understood according to conventional usage by those of ordinary skill in the relevant art.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable.

The modifier "about" used in connection with a quantity is inclusive of the stated value and has the meaning dictated by the context (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Embodiments of the invention are intended to more evenly distribute the force along the planet gear tooth width and to more evenly share the loading among the various planet gears. The planet gears can be secured more centrally, allowing the planet pins to flex to a greater degree. If this centralized support is connected to support segments, for example, bearings, which are then attached to the carrier walls, it will create two more narrowed regions which will allow the pivoting of the centralized region to be enhanced. Also, choosing the correct axial position in which to secure the planet gears to the planet pins will allow the planet gears to self-align and distribute their force more evenly along the planet gear tooth width. For planet gears that have an overturning moment, a sliding flattened interface between the planet pins and the planet gears can be fashioned to resist such a moment. The flattened region will resist the overturning moment while sliding in the tangential direction. The planet pins can be designed to have a non-circular cross-section in order to be stiffer in the overturning moment direction than the tangential direction. These segments can be attached by interference or bolted.

Figure 2:
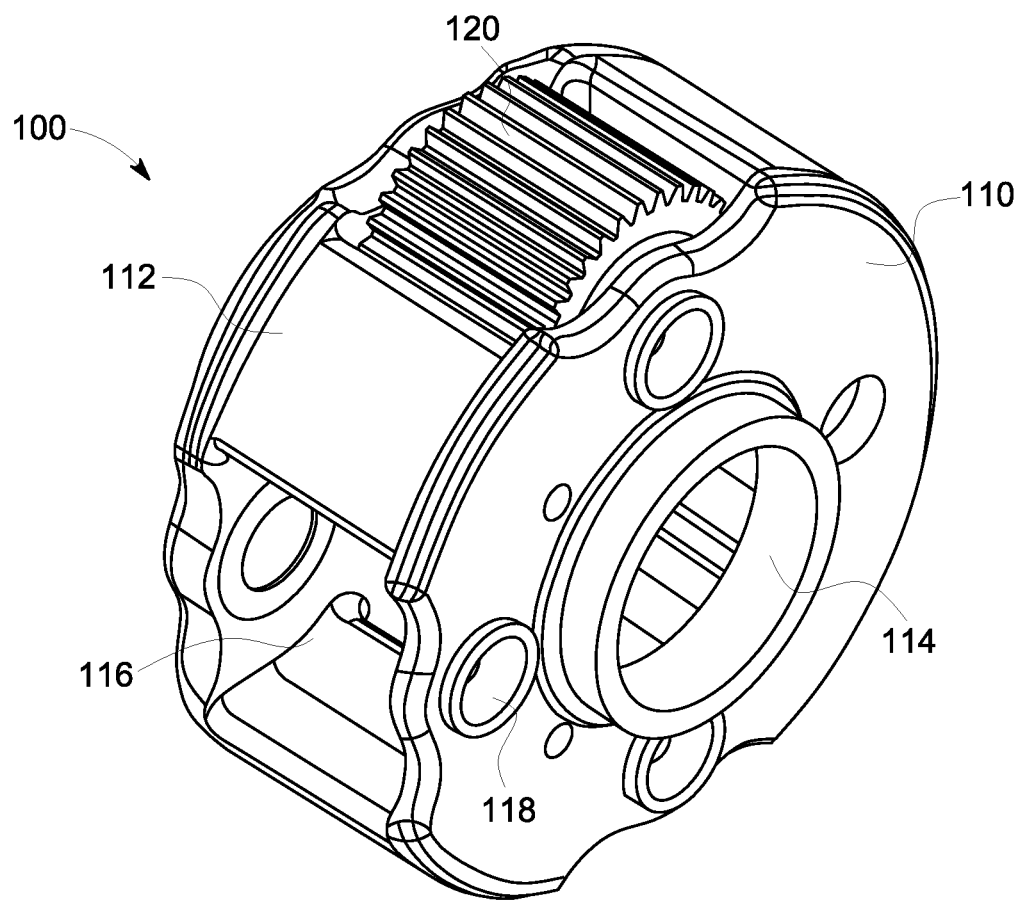
FIG. 2 is a schematic view illustrating a carrier and one planet gear in accordance with an embodiment of the invention.

FIG. 2 illustrates a planetary gear system 100 including a carrier 110 and a planet gear 120. The carrier 110 has a carrier body 112 which includes a sun gear opening 114, a plurality of planet gear openings 116, and a plurality of planet pin openings 118. The planet pin openings 118 serve as anchoring points for planet pins, about which each planet gear 120 is disposed. A portion of each planet gear 120 protrudes through a respective planet gear opening 116. Although only a single planet gear 120 is illustrated in FIG. 2, it is to be understood that four such planet gears 120 are intended for mounting on the carrier 110 of FIG. 2. Further, it is to be understood that more or less than four planet gears 120 may be mounted on a carrier, depending upon the need and the configuration of the carrier.

Figure 3:
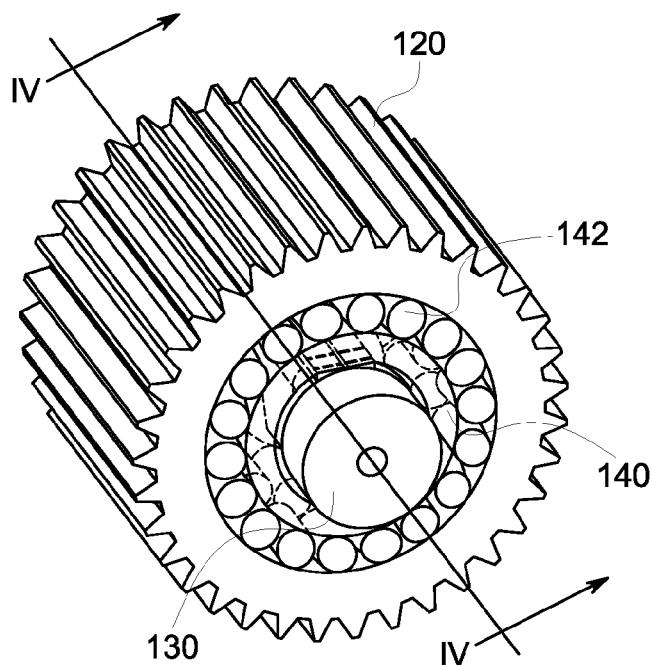
FIG. 3 is a schematic view of the planet gear of FIG. 2 in accordance with an embodiment of the invention.
Figure 4:
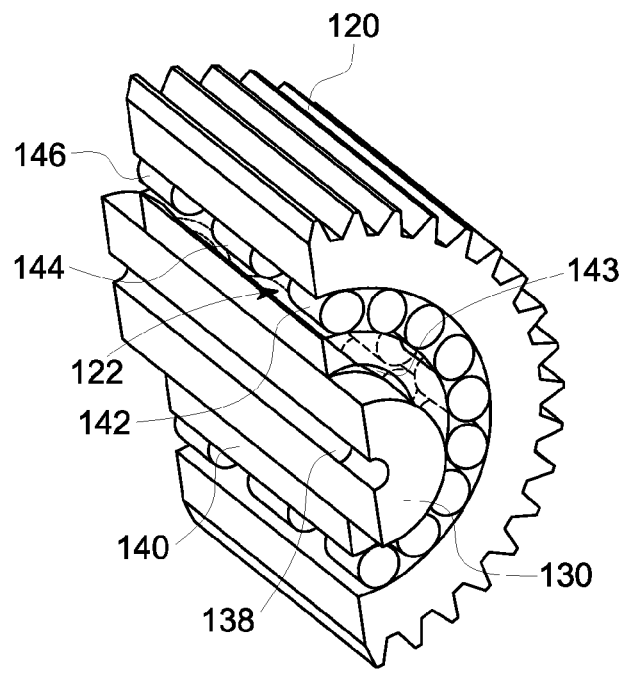
FIG. 4 is a cross-sectional view of the planet gear of FIG. 3 taken along line IV-IV.

FIGS. 3 and 4 illustrate the planet gear 120 of FIG. 2 in greater clarity. As shown, the planet gear 120 is disposed about a planet pin 130. Specifically, the planet pin 130 extends through an interior space 122 of the planet gear 120.

Surrounding the planet pin 130 is a sleeve 140 and three sets of rollers, generally denominated as outer rollers 142, mid rollers 144, and inner rollers 144. The rollers 142, 144, 146 contact the sleeve 140 and an inner surface of the planet gear 120. An inner surface 143 of the sleeve 140 is attached to the planet pin 130 at a mid-section of the pin. Through this configuration, the planet gear 120 is enabled to rotate relative to the carrier, such as carrier 110.

Figure 5:
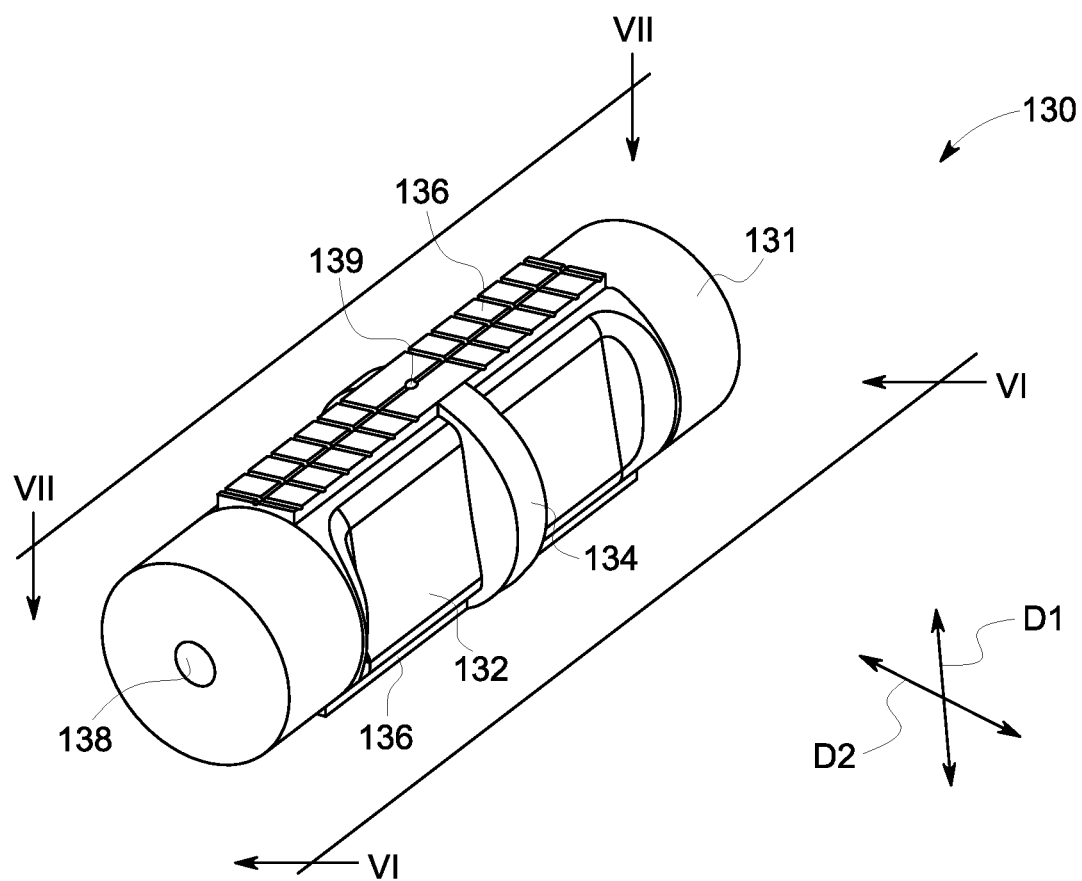
FIG. 5 is a schematic view of a planet pin in accordance with an embodiment of the invention.
Figure 6A:
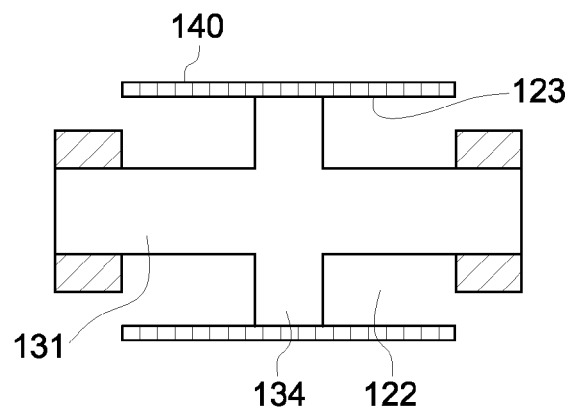
FIGS. 6(A)-(C) are cross-sectional views of the planet pin of FIG. 5 taken along line VI-VI and showing the effects of force thereon in accordance with an embodiment of the invention.
Figure 6B:
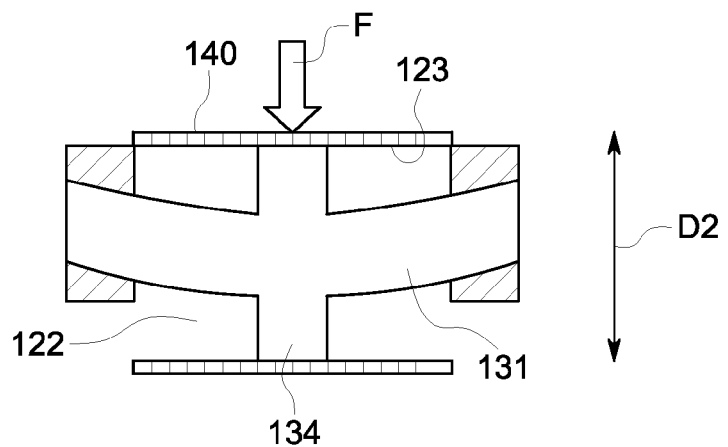
Figure 6C:
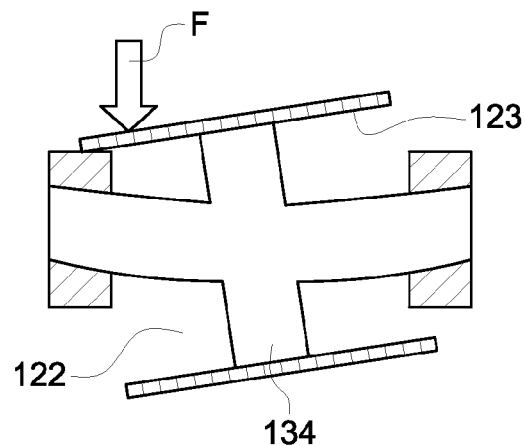
Figure 7:
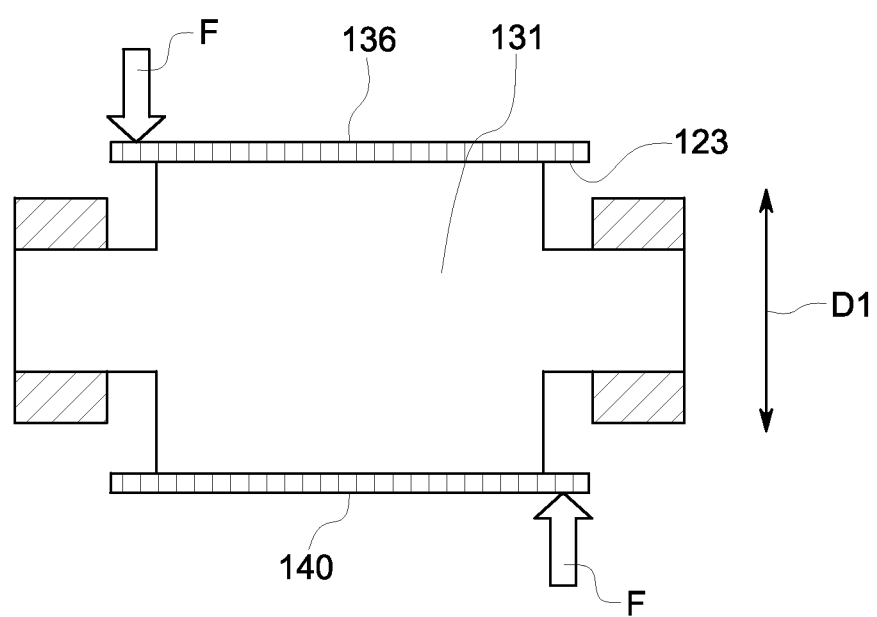
FIG. 7 is a cross-sectional view of the planet pin of FIG. 5 taken along line VII-VII and showing the effects of force thereon in accordance with an embodiment of the invention.

FIGS. 5-7 illustrate one embodiment of a planet pin. The planet pin 130 includes a body 130 with a flexure portion. The flexure portion includes a pair of grooves 132 separated by a rib 134. Although FIG. 5 only shows grooves 132 and the rib 134 on one side of the body 131, it is to be understood, and FIGS. 6(A)-(C) make clear, that the grooves 132 are located on opposing sides of the body 131 and the rib 134 extends through the body 131. Plates 136 are positioned on surfaces orthogonal to the opposing grooves 132. The rib 134 and the plates 136 serve to provide additional stiffness in a first direction D1 for the pin body 131. The grooves 132 serve to provide extra elasticity to the pin body 131 in a second direction D2 orthogonal to the first direction D1. The pin body 131 and the plates 136 are formed of a material strong enough to withstand maximum loads and fatigue and flexible enough to allow for elastic deformation when stressed by a force.

An axial oil path 138 extends through the pin body 131 and meets up with a radial oil path 139. Oil may be pumped through the oil paths 138, 139 to supply lubrication to the planet pin 130 and the planet gear 120.

FIG. 6(A) illustrates the planet pin body 131 with no force being exerted on the sleeve 140, which is positioned within the planet gear 120 (not shown). The planet pin body 131 extends between a pair of bearings and the rib 134 extends through the interior space 122 to contact and attach to an inner surface 143 of the sleeve 140.

As a force is exerted on the planet gear 120, the flexure portion of the planet pin 130 flexes in the second direction D2 in response thereto. As shown in FIG. 6(B), a force F is exerted at a midpoint of the sleeve 140, approximately where the rib 134 is located. The force F pushes the sleeve 140 rotationally inward and the planet pin body 131 flexure portion flexes within the interior space 122 in the direction of the force F, parallel to the direction D2. The rib 134 maintains contact with the inner surface 143 of the sleeve 140.

When a force is exerted on one side of the planet gear 120, the planet gear 120 is dislocated in a tangentially uneven fashion. As illustrated in FIG. 6(C), a force F is exerted on one side of the planet gear 120, nearer to one of the bearings than the other. The planet gear 120 tilts such that the side on which the force F is being exerted is pushed down while the opposite side elevates somewhat from its normal position. Once again, the rib 134 maintains contact with the inner surface 143 of the sleeve 140. The planet pin body 131 flexure portion flexes within the interior space 122 in the direction of the force F.

FIG. 7 illustrates the effect that a force in the first direction D1 has on the planet gear 120. The pin body 131 is in flat parallel sliding contact with the inner race of the bearing. When a force F is applied in a direction parallel to the first direction D1, the plates 136 provide additional stiffness to inhibit flexing of the flexure portion of the planet pin body 131 in the direction of the force F.

Figure 8A:
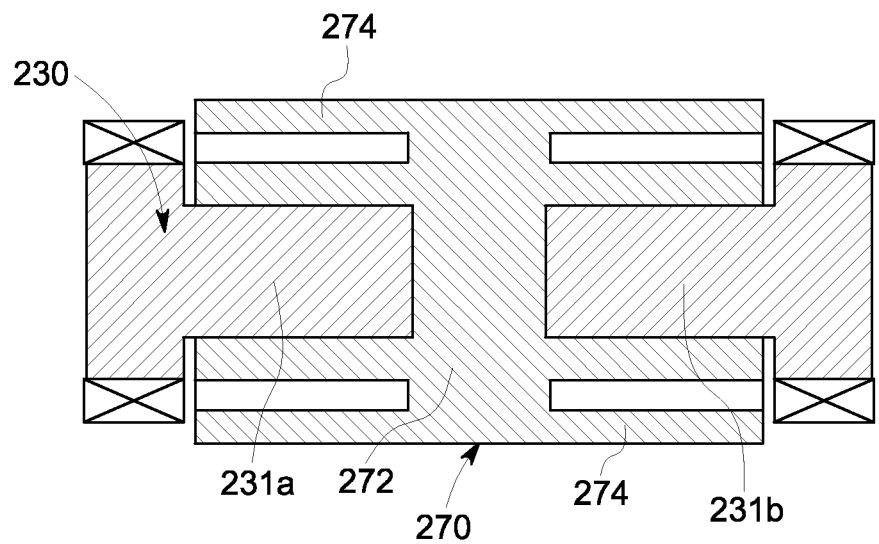
FIGS. 8(A) and (B) are partial cross-sectional views of a planet gear and a planet pin showing the effects of force thereon in accordance with an embodiment of the invention.

FIGS. 8(A) and (B) illustrate another embodiment of the invention. A planet pin 230 having a flexure portion extends through a planet gear (not shown) between a pair of bearings. The flexure portion of the planet pin 230 includes a first pin body 231a and a second pin body 231b. One enlarged end of the first pin body 231a is press fit into one bearing, while one enlarged end of the second pin body 231b is press fit into an opposite bearing.

The flexure portion of the planet pin 230 further includes a barrel 270 that serves to connect the planet pin bodies 231a and 231b. The barrel 270 includes a barrel core 272 from which a pair of barrel flanges 274 extends. The barrel flanges 274 each have a gap 276 extending to the barrel core 272. Radially interior to the barrel flanges 274 are barrel annuluses 278, each having a surface 279. The planet pin bodies 231a, 231b are interference fit against the surfaces 279 within the annuluses 278. Though not shown, an oil pathway is located axially through the barrel flanges 274 and radially outward through the barrel core 272.

The planet pin bodies 231a and 231b, as well as the barrel 270, are formed of a material strong enough to withstand maximum loads and fatigue and flexible enough to allow for elastic deformation when stressed by a force.

Figure 8B:
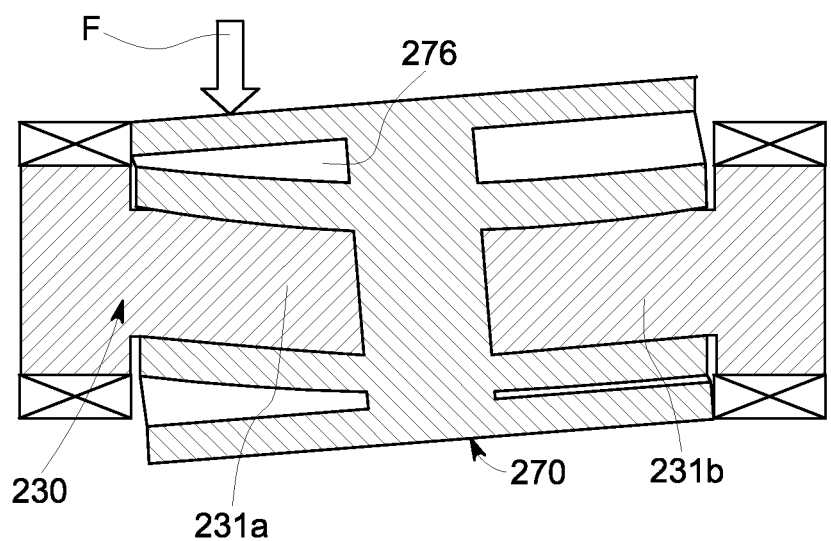

When a force F is exerted on the planet gear, the planet gear is pushed radially inward in the direction of the force F. For an offset force F exerted on the planet gear, the force F translates through the planet gear 220 and pushes into one side of the barrel flanges 274, causing the barrel 270 to cant and the planet pin bodies 231a, 231b to flex in the direction of the force F. As illustrated in FIG. 8(B), a top portion of one side of the barrel flanges 274 and a bottom portion of the other side of the barrel flanges 274 crimp into the gaps 276, while a bottom portion of one side of the barrel flanges 274 and a top portion of the other side of the barrel flanges 274 expand the gaps 276. In this stressed state, the barrel core 272 cants slightly.

Figure 9A:
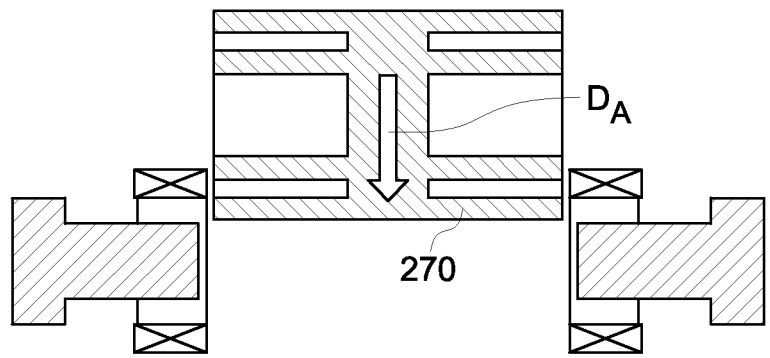
FIGS. 9(A)-(C) are cross-sectional views of the planet pin of FIGS. 8(A) and (B) illustrating its fabrication in accordance with an embodiment of the invention.
Figure 9B:
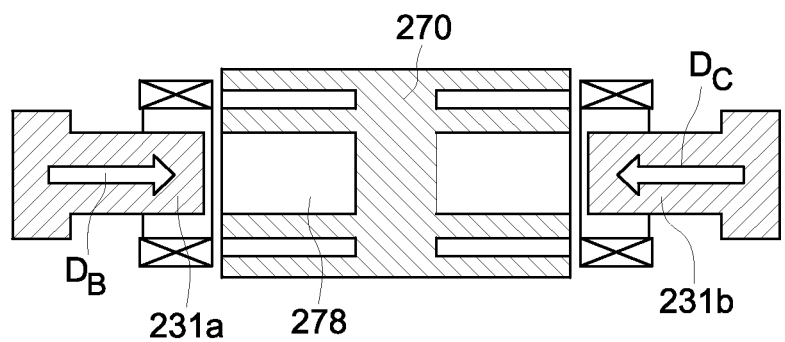
Figure 9C:
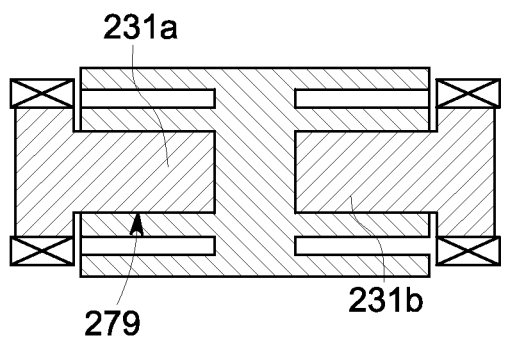
Figure 10:
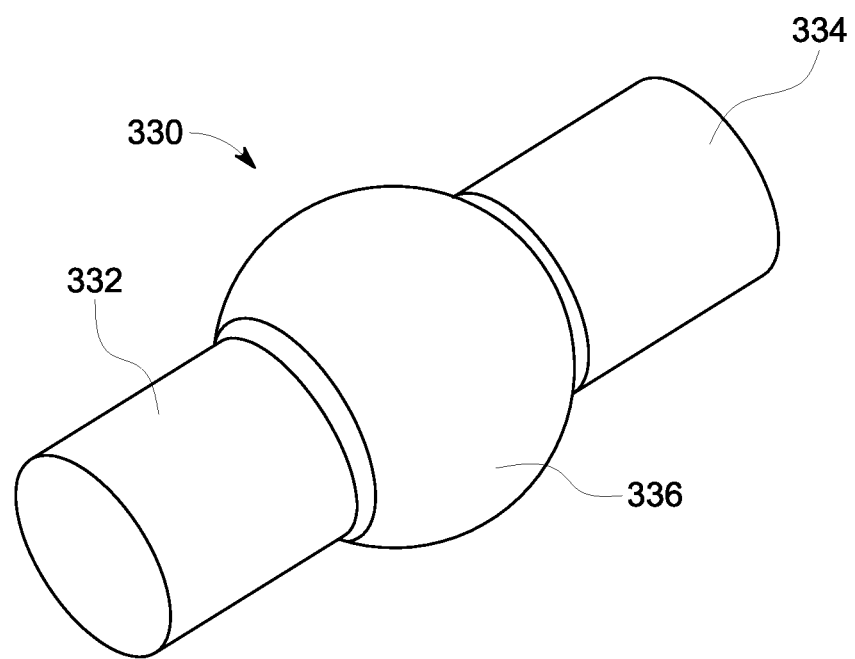
FIG. 10 is a schematic view of a ball joint planet pin in accordance with an embodiment of the invention.

FIGS. 9(A)-(C) illustrate a method of fabricating the planet pin 230. FIG. 9(A) illustrates that the barrel 270 is moved in a direction $D_A$ between the planet pin bodies. Then, as shown in FIG. 9(B), once the barrel 270 is in position, the planet pin bodies 231a, 231b respectively move in opposite directions $D_B$, $D_C$ through opposing bearings toward the barrel annuluses 278. Finally, as shown in FIG. 9(C), the planet pin bodies 231a, 231b are press fit against the surfaces 279 of the annuluses while the enlarged ends thereof are press fit into the bearings.

FIGS. 10-13 illustrate another embodiment of the planet pin. As shown schematically in FIG. 10, a ball joint planet pin 330 is shown having a flexure portion including pin arms 332, 334 on opposing sides of a pin core 336. The pin core 336 is spherical in shape, while the pin arms 332, 334, like the planet pin bodies of other embodiments herein, are cylindrical in shape. A radially directed opening 392 is bored in the core 336 (FIG. 11(B)) and joins an axially directed opening 390 bored through the pin arm 332. Oil may be pumped through the openings 390, 392 to supply lubrication to the ball joint planet pin 330 and the planet gear 120.

Figure 11A:
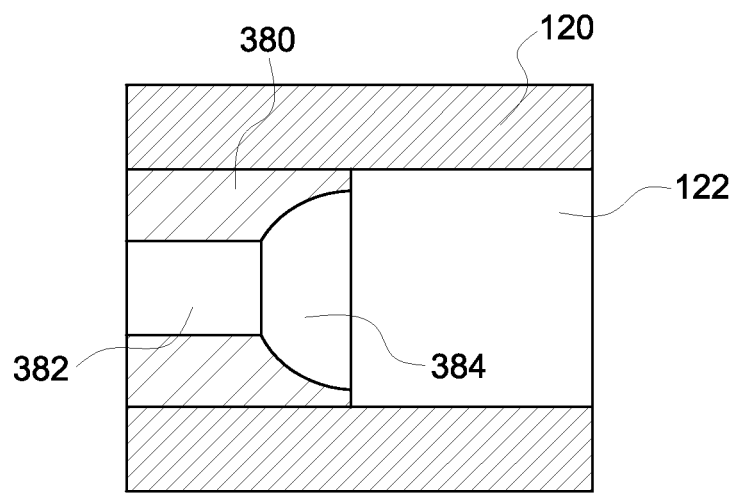
FIGS. 11(A) and (B) are cross-sectional views illustrating the installation of the ball joint planet pin in a planet gear in accordance with an embodiment of the invention.

FIGS. 11(A) and (B) and 12 illustrate the installation of the ball joint planet pin 330 into a planet gear, such as planet gear 120. As shown in FIG. 11(A), a first insert 380 is positioned within the interior space 122 of the planet gear 120. The insert 380 is sized to create an interference fit between it and the planet gear 120. The first insert 380 includes a first opening 382 that extends to a first tapered seat 384. The ball joint planet pin 330 is then extended into the interior space 122 of the planet gear 120 such that the pin arm 332 extends through the first opening 382 and a portion of the pin core 336 sits within the first tapered seat 384.

Figure 12:
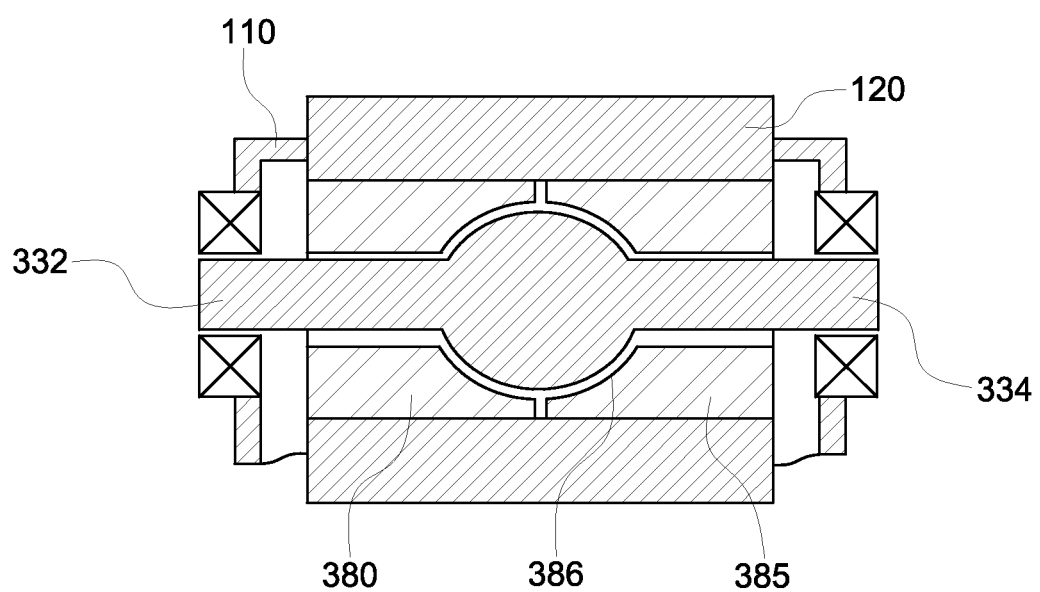
FIG. 12 is a partial cross-sectional view showing the ball joint planet pin of FIGS. 11(A) and (B) installed within a planet gear and a carrier in accordance with an embodiment of the invention.

As shown in FIG. 12, a second insert 385 is interference fit within the interior space 122 of the planet gear 120. The second insert 385 is a mirror image of the first insert and includes a second opening that extends toward a second tapered seat 386. The pin arm 334 extends through the second opening and a portion of the pin core 336 sits on the second tapered seat 386. The pin arms 332, 334 are secured to bearings, which are interference fit within planet pin openings, such as openings 118 (FIG. 2) of the carrier 110.

Figure 13A:
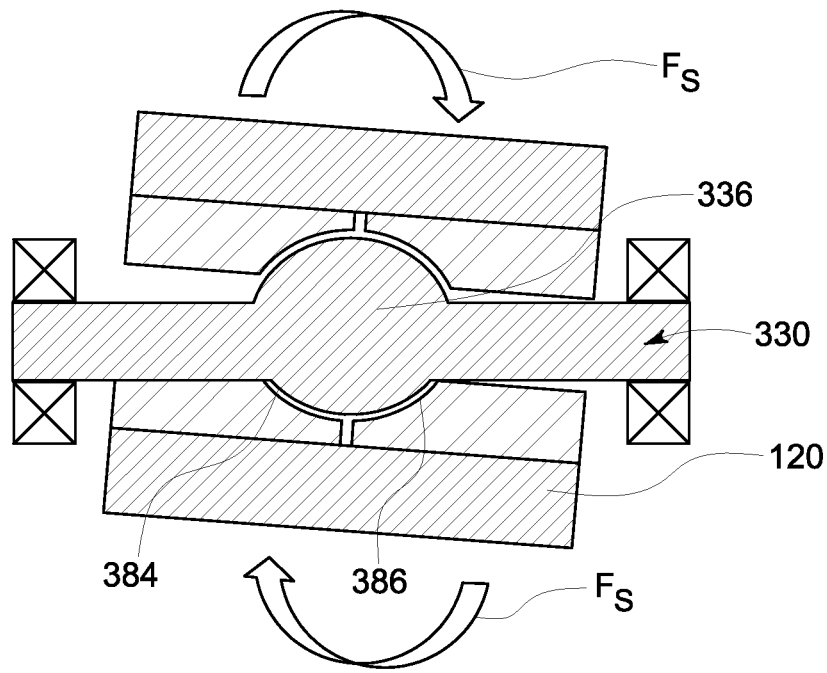
FIGS. 13 (A) and (B) are cross-sectional views of the ball joint planet pin of FIGS. 11(A) and (B) showing the effects of force thereon in accordance with an embodiment of the invention.
Figure 13B:
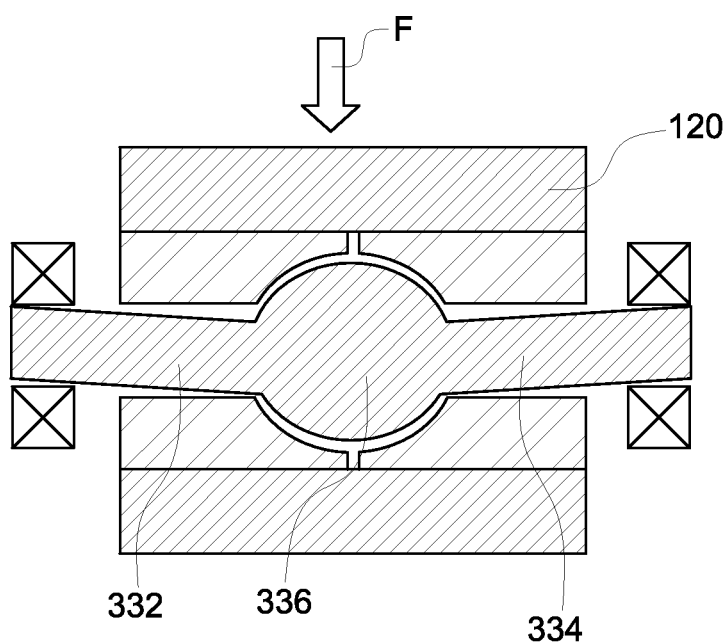

FIGS. 13(A) and (B) illustrate the effect of force on a ball joint planet pin, such as ball joint planet pin 330. When a shearing force $F_S$ (FIG. 11(A)) is exerted on the planet gear 120, the planet gear cants and/or swivels about the pin core 336. Depending upon the magnitude of the force $F_S$, the pin arms may or may not flex in response. As shown in FIG. 11(A), the pin arms are not flexed in response to the force $F_S$. Once the force $F_S$ has subsided, the planet gear 120 can resume is normal, unstressed position about the ball joint planet pin 330.

Figure 11B:
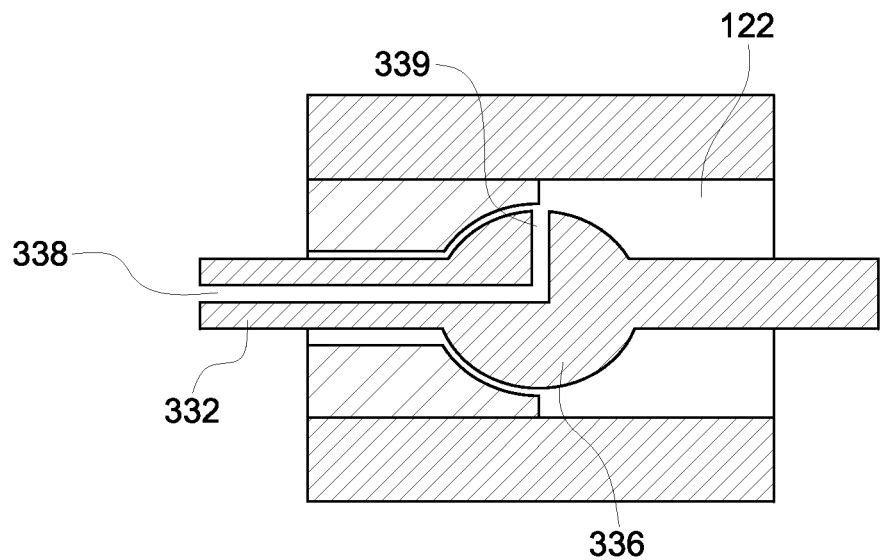

When a force F (FIG. 11(B)) is exerted at a location approximately about the pin core 336, the planet gear 120 is pushed in the direction of the pin core 336. The pin core 336 is itself pushed further into the first and second tapered seats, causing the pin arms 332, 334 to flex within the insert openings in response to the force F.

Figure 14:
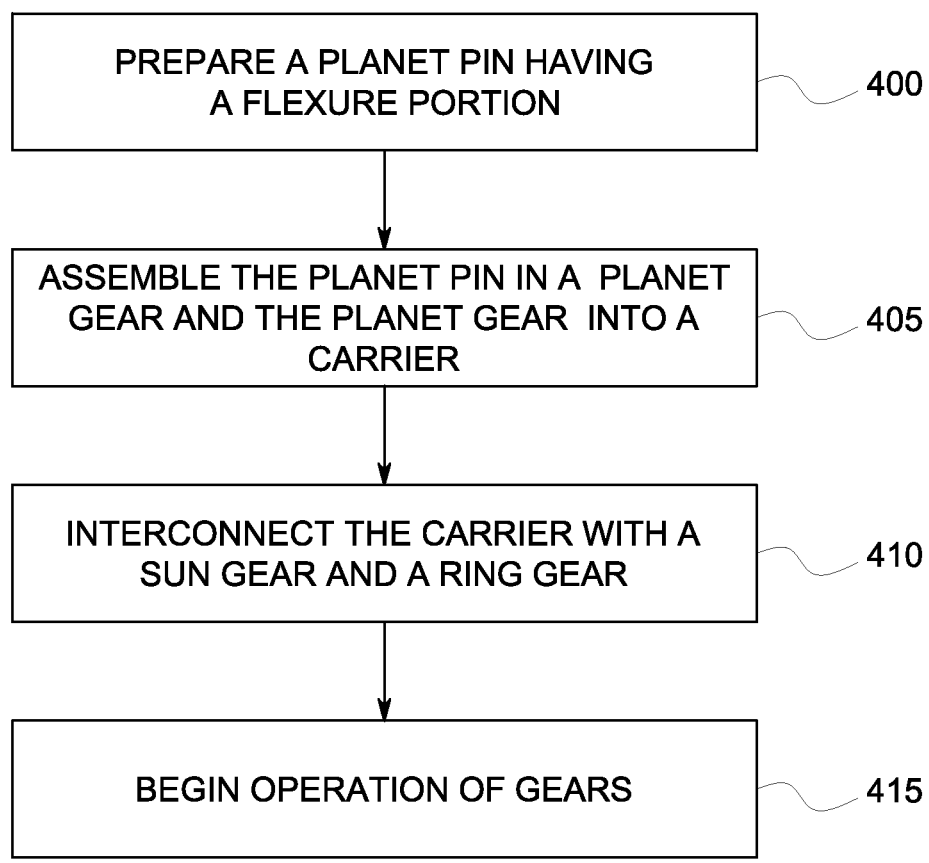
FIG. 14 is a flowchart illustrating a method for balancing a load placed upon a planetary gear system in accordance with an embodiment of the invention.

Next, and with particular reference to FIG. 14, is described a method for balancing a load placed upon a planetary gear system, such as a planetary gear system used in a wind turbine.

At Step 400, a planet pin is prepared. The planet pin includes a planet pin body includes a flexure portion. For a planet pin such as the planet pin embodiment illustrated in FIGS. 5-7, the flexure portion includes grooves 132 separated by a centrally-located rib 134. The grooves 132 are on opposing sides of the planet pin body 131, and the rib 134 extends through the planet pin body 131.

For a planet pin such as the planet pin embodiment illustrated in FIGS. 8 and 9, the flexure portion takes the form of a body member of each of a pair of planet pin bodies 231a, 231b. For a planet pin such as the planet pin embodiment illustrated in FIGS. 10-13, the flexure portion takes the form of a planet pin arms 332, 334.

At Step 405, the planet pin is assembled in a planet gear and the planet gear is assembled into a carrier. For the embodiment illustrated in FIGS. 5-7, assembly of the planet pin 130 in the planet gear 120 includes extending the planet pin 130 through an interior space 122 of the planet gear 120, ensuring that the rib 134 attaches to a sleeve 140, which is radially interior to rollers, such as rollers 142, 144, 146. The rollers contact an inner surface of the planet gear 120. Then, the planet gear 120 is positioned within the planet gear opening 116 (FIG. 2) and the planet pin body 131 is fit within the planet pin openings 118.

For the embodiment illustrated in FIGS. 8 and 9, assembly of the planet pin 230 entails moving a barrel, such as barrel 270 into position at an interior location of a planet gear. The planet gear is then positioned within the planet gear opening 116 (FIG. 2). An enlarged end of one of the pair of planet pin bodies 231a, 231b is interference fit into a bearing, and that planet pin body is moved into a barrel annulus 278. Then, the enlarged end of the other of the first and second planet pin bodies 231a, 231b is interference fit with the other bearing and moved into the opposing barrel annulus 278. The first and second planet pin bodies 231a, 231b are interference fit against surfaces 279 of the barrel annuluses 278 and the bearings are interference fit within the planet pin openings 118.

For the embodiment illustrated in FIGS. 10-13, a first insert 380 is interference fit within an interior space 122 of the planet gear 120. The ball joint planet pin 330 is then fed through an opening 382 of the insert 380 such that a portion of the pin core 336 sits on the tapered seat 384. The other insert 385 is then interference fit within the interior space 122 of the planet gear 120 such that another portion of the pin core 336 sits on the tapered seat 386 of the second insert. The planet gear 120 may then be positioned within the planet gear opening 116 (FIG. 2), with the planet pin arms 332, 334 extending out of respective planet pin openings 118. Bearings are then interference fit against the planet pin arms 332, 334 and the planet pin openings 118.

At Step 410, a carrier, such as carrier 110 having loaded thereon the planet gears and planet pins described above, is interconnected with a rotatable central, or sun, gear and a ring gear. Finally, at Step 415, the gears are allowed to operate.

The embodiments of the invention described herein will enable an increase in torque capacity, as well as an improved load distribution, for a planetary gearbox. Further, these enhancements are enabled with a minimum of overall mass impact on the gearbox.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A planet pin configured to serve as an anchoring point for a planet gear within a carrier, comprising a planet pin body having a flexure portion between a pair of ends, wherein the planet pin body comprises:
   first and second pairs of grooves allowing flexure of the planet pin body in a first direction and a rib, the first pair of grooves being located on an opposing side of the planet pin body from the second pair of grooves, and grooves from each of the pair of grooves being separated by the rib.

2. The planet pin of claim 1, comprising a pair of plates positioned on surfaces of the planet pin body between the first and second pairs of grooves, the pair of plates inhibiting flexure of the planet pin body in a second direction orthogonal to the first direction.

3. The planet pin of claim 1, comprising an oil path through the planet pin body.

4. A planetary gear system, comprising:
   a carrier having a central opening, a plurality of peripherally located openings and a plurality of planet pin openings;
   a rotatable central gear located within the central opening; and
   a plurality of peripheral planet gears in meshed relationships with the rotatable central gear and anchored within respective ones of the planet pin openings with a planet pin, each said planet pin has a planet pin body comprising:
   a flexure portion having first and second pairs of grooves allowing flexure of the planet pin body in a first direction, the first pair of grooves being located on an opposing side of the planet pin body from the second pair of grooves;

a rib separating the grooves of each of the pairs of grooves; and a pair of plates positioned on opposing surfaces of the planet pin body inhibiting flexure of the planet pin body in a second direction orthogonal to the first direction.

5. The planetary gear system of claim 4 for use in a wind turbine.

6. A method for balancing a load on a planetary gear system between respective planet gears, comprising:

preparing a plurality of planet pins, each of the planet pins including a flexure portion;

assembling the planet pins in a respective one of the planet gears;

positioning the planet gears within a carrier; and intermeshing the planet gears with a central gear and a ring gear, wherein said preparing comprises providing for the flexure portions of each of the plurality of planet pins first and second pairs of grooves that allow flexure in a first direction, the first pair of grooves being located on opposing sides of the planet pins from the second pair of grooves, providing for each of the plurality of planet pins a rib separating the grooves of each of the pairs of grooves, and providing for each of the plurality of planet pins a pair of plates positioned on opposing surfaces of the planet pins that inhibit flexure in a second direction orthogonal to the first direction.

7. The method of claim 6, wherein said assembling comprises securing each of the plurality of planet pins with a bearing within a respective one of planet pin openings in the carrier.

* * * * *